(12) United States Patent
Gil et al.

(10) Patent No.: US 6,908,309 B2
(45) Date of Patent: Jun. 21, 2005

(54) DEMONSTRATION DEVICES FOR MEDICAL PROCEDURES

(75) Inventors: Carlos Gil, Sammamish, WA (US); Alex Kunzler, Issaquah, WA (US)

(73) Assignee: SDGI Holdings, Inc., Wilmington, DE (US)

( * ) Notice: Subject to any disclaimer, the term of this patent is extended or adjusted under 35 U.S.C. 154(b) by 0 days.

(21) Appl. No.: 10/307,843

(22) Filed: Dec. 2, 2002

(65) Prior Publication Data

US 2003/0138764 A1 Jul. 24, 2003

Related U.S. Application Data

(60) Provisional application No. 60/337,246, filed on Dec. 3, 2001.

(51) Int. Cl.[7] .............................................. G09B 23/28
(52) U.S. Cl. ...................................... 434/267; 434/274
(58) Field of Search ................................ 434/262, 267, 434/270, 271, 274

(56) References Cited

U.S. PATENT DOCUMENTS

| | | | | |
|---|---|---|---|---|
| 1,581,736 A | * | 4/1926 | Hassler | 434/274 |
| 2,103,021 A | * | 12/1937 | Salsman | 434/274 |
| 4,872,841 A | * | 10/1989 | Hamilton et al. | 434/274 |
| 5,368,487 A | * | 11/1994 | Medina | 434/262 |
| 5,376,007 A | * | 12/1994 | Zirm | 434/262 |
| 5,441,413 A | * | 8/1995 | Kumar | 434/275 |
| 5,672,059 A | * | 9/1997 | Browne-Wilkinson | 434/274 |
| 5,906,205 A | * | 5/1999 | Hiebert | 128/845 |
| 5,947,743 A | * | 9/1999 | Hasson | 434/262 |
| 5,997,307 A | * | 12/1999 | LeJeune, Jr. | 434/262 |
| 6,422,874 B1 | * | 7/2002 | Green et al. | 434/274 |
| 6,422,875 B1 | * | 7/2002 | Patak et al. | 434/408 |

* cited by examiner

*Primary Examiner*—Kurt Fernstrom
(74) *Attorney, Agent, or Firm*—Haynes and Boone, LLP

(57) ABSTRACT

A demonstration model assembly having an anatomical model structure that is stabilized by a support in a relatively compact area on a stable surface is provided. The anatomical model structure is a reproduction of a patient's anatomy, preferably the vertebral column, that is at least partially and removably embedded in a support. Also provided is a demonstration platform adapted to simulate surgical operating room conditions, such as an operating table with side rails and the like. The simulated operating room conditions facilitate the demonstration of various surgical techniques. The demonstration platform may also act as a container and a transporting device for the instruments and other materials used in the demonstration with the side rails acting as handles for the demonstration platform.

10 Claims, 7 Drawing Sheets

DEMONSTRATION DEVICES FOR MEDICAL PROCEDURES

BACKGROUND

This disclosure claims the benefit of U.S. Ser. No. 60/337,246, which was filed Dec. 3, 2001 and which is hereby incorporated by reference.

The present invention relates to a surgical demonstration device, and more particularly, to a kit for demonstrating surgical techniques and methods that use equipment positioned in a particular orientation with respect to an operating room table.

Demonstration devices for medical procedures are helpful in training and educating medical personnel. For example, when surgical companies present a new product, such as a new instrument or a surgical implant, there is a need to demonstrate the surgical procedures for using the product to surgeons, nurses, technicians, students, and any other medical professionals. It is particularly advantageous to demonstrate new surgical techniques in simulated surgical procedures. Surgical company personnel, for instance, may wish to demonstrate new surgical techniques or devices on a workpiece which simulates the portion of the human body where the medical procedure will be performed. Additionally, it is advantageous to provide students with hands-on experience, i.e., operating on simulated body structures when learning surgical procedures. Surgical company representatives, surgeons, students, or other personnel, will benefit from training for new medical procedures with an apparatus tailored to demonstrate the procedures as an important part of any training program.

With respect to training for new techniques and instrumentation, surgeons may be reluctant to depart from a familiar method or technique unless they can be clearly convinced of the superiority of a new instrument or technique. Because demonstrations often take place in exhibition centers, hotel conference rooms, private offices, clinics, operating rooms, university lecture rooms, classrooms, and the like, it is advantageous for the demonstration showing the technique and instruments to be clear and straightforward, without the need for excessive preparation or additional instrumentation. If the demonstration equipment is unstable or difficult to use, it will generally be more difficult to convince surgeons and other medical personnel to undergo further training, and ultimately, to adopt the new procedure.

It is desirable for all of the instruments, implants, etc., required for a successful surgery to be provided or available during demonstration. For example, if the surgical procedure requires mounting clamps on the operating table side rails, it is impracticable to teach the procedure without the operating room side rails, but equally as impracticable to provide an entire operating room table in the demonstration area. Likewise, if the surgical procedure is to be practiced on the vertebral column, but only focuses on, for example, two or three vertebrae, it is advantageous to show the procedure performed on a replica of the actual target site, rather than an entire vertebral column. At the same time, it is desirable to be able to remove the smaller surgical site model from the support to allow closer viewing of the surface either before or after the procedure has been performed.

It is further optimal for the demonstration that is provided to simulate the surgical conditions as closely as possible, including the touch and feel of the instruments as used in relation to the patient's anatomy. Video demonstrations of the procedure and visual demonstrations where the surgeons view the use of the instruments by trained company representatives are helpful, but it is more helpful to provide hands on experience for the surgeons.

In order to provide this hands-on experience, demonstration model assemblies of the area in which the instruments and methods will be used are helpful. Although in some instances it is possible to use cadavers for training, this is expensive and difficult to coordinate. The cadavers must be preserved and transported to each training location, which becomes impracticable. Additionally, there may only be a limited training area or working space to perform a demonstration.

Also, the surgeons or sales representatives may only have a brief period of time in which to teach and/or learn, and therefore, the items used in the demonstrations should be organized and readily available. Because of the convenience, portable models are commonly used for training. Most portable models simulate a particular portion of the patient's body in which the surgical procedure is to be performed. For example, if the surgical site is the vertebral column, a replica of all or a portion of the vertebral column is provided. If the surgical procedure requires access to a particular internal portion of the body, a sample portion of that part of the human body is provided. In order to provide the desired training benefits, it is optimal for the portable models to be large enough to provide a stable surface, similar to a patient's surgical site, without being bulky.

This presents several problems. Sample models that are small tend to be unstable if they are merely reproductions of the actual surgical site, such as a free-standing vertebral column. On the other hand, sample models tend to be bulky if they are configured to represent the entire portion of the human body where the surgical procedure is performed, such as a model of the dorsal part of a human torso, housing the vertebral column. There is a competing interest between stabilizing the demonstration model assembly to allow the surgeon a feel for the actual procedure, while providing a model that is practical for use in a limited surgical demonstration area. Accordingly, there is a need for demonstration model assemblies that balance size and stability considerations.

Once the demonstration model assembly is provided, it is helpful for the surgeon to practice on the demonstration model assembly in a way that mimics the surgical setting. There is a need to be able to consistently reproduce relative surgical conditions during demonstrations or practice sessions. Particularly if the surgery requires specialized equipment used in relation to the operating room table or other surgical element present during surgery, it is helpful for the surgeon to be able to learn and practice using the tools in a sample environment that approximates that of the actual operating theater. For example, if the surgery entails attaching equipment to the operating room table or other structure in the operating field, it is helpful to provide at least that portion of the table or structure during a demonstration or teaching session for a complete presentation. Additionally, due to various space constraints, it is beneficial to provide a replica or simulation of a portion of an operating room table, rather than requiring an actual full-sized operating room table or other surgical element.

SUMMARY

The present disclosure provides a surgical model that is stabilized in a relatively compact area, and provides a stable surface for demonstration. The present disclosure also provides a surface adapted to simulate surgical conditions, such as operating table side rails and the like.

One embodiment of the invention provides a demonstration model assembly having a support and an anatomical model structure at least partially and removably embedded in the support. Another embodiment of the invention provides a demonstration platform, comprising a two sides and a top surface, at least one reduced-length operating table side rail attached to at least one side, and a connecting structure related to the top surface adapted to receive a demonstration model assembly.

A further embodiment of the invention provides a mounting clamp with a cradle having shoulders adapted to receive and secure the base of a demonstration model assembly. The mounting clamp also has an attachment structure on the cradle, the attachment structure adapted to correspond and secure the mounting clamp to any stabilizing surface, such as a demonstration platform.

When used in conjunction, the various embodiments provide a demonstration model system, comprising a demonstration platform approximating operating table side rails, a demonstration model assembly, comprising an anatomical model structure and a support, and a mounting clamp adapted to mount the demonstration model assembly to the demonstration platform.

BRIEF DESCRIPTION OF THE DRAWINGS

FIG. 2a shows a side perspective view of an anatomical model structure and FIG. 2b shows a top perspective view of a support.

DETAILED DESCRIPTION

Figure 1:
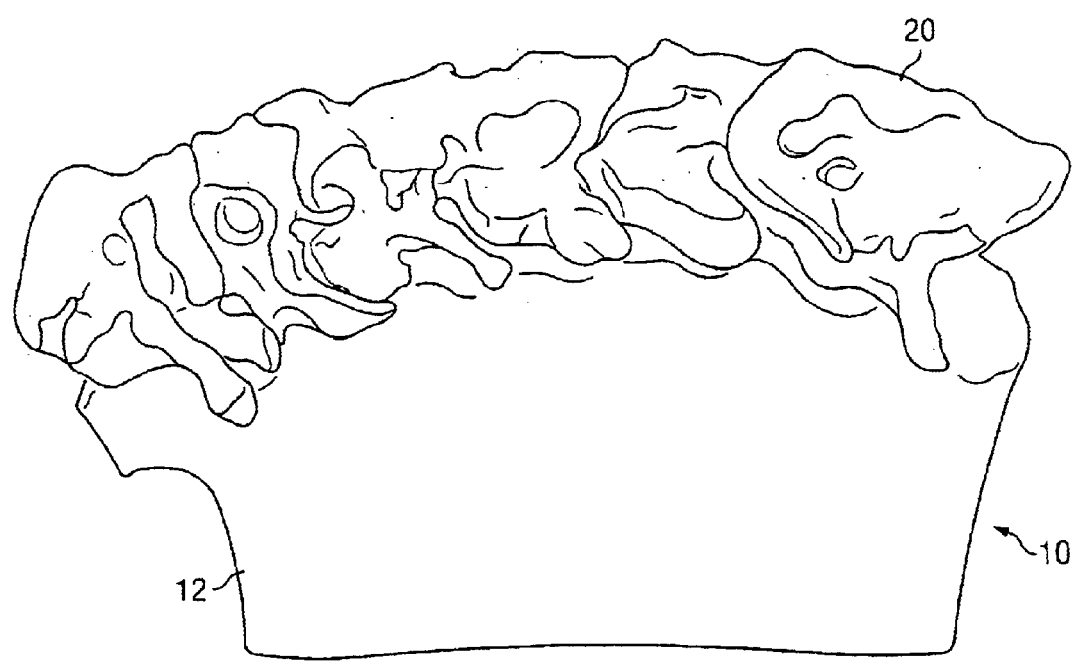
FIG. 1 is a side perspective view of a demonstration model assembly according to one embodiment of the present invention.

FIG. 1 shows a specific embodiment of demonstration model assembly 10, an assembly for teaching, research, marketing, and any other circumstances in which a demonstration, surgical or otherwise, would be performed. Demonstration model assembly 10 preferably comprises a support 12 that is adapted to correspond to anatomical model structure 20, which is at least partially and removably embedded in support 12.

Figure 2A:
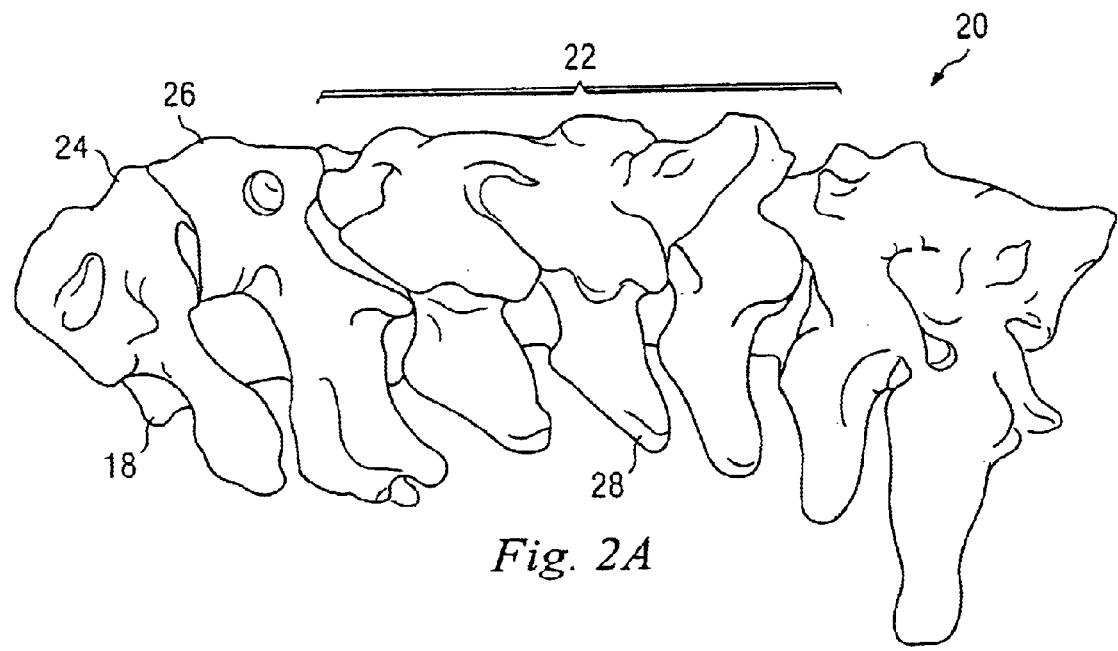
FIGS. 2a–2b show perspective views of the components of the demonstration model assembly of FIG. 1 disassembled.
Figure 2B:
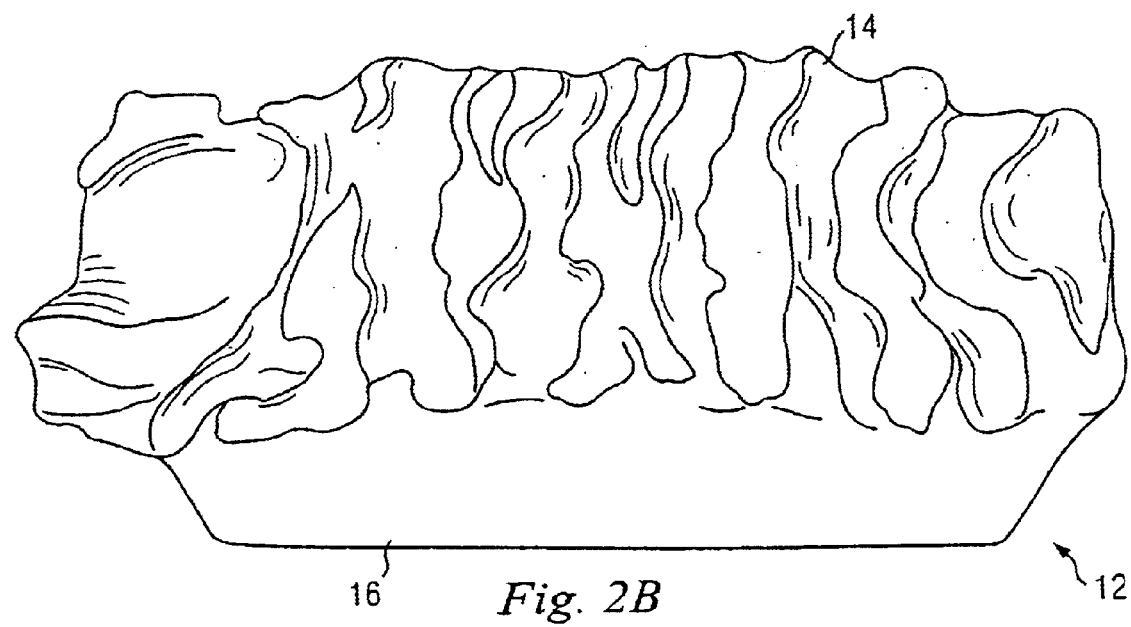

Support 12 is shown in more detail in FIG. 2b. Support 12 is preferably comprised of silicone, rubber, acrylic, or any combination thereof, or any other suitable material. Preferably, support 12 is semi-rigid, so that it retains some amount of flexibility, while providing a stable surface for anatomical model structure 20. In a preferred embodiment, anatomical model structure 20 is removable from and re-insertable into support 12.

Support 12 has coupler portions 14 that are adapted to receive surfaces of anatomical model structure 20. Although coupler portions 14 are shows as indentations or recessed areas adapted to receive bony protrusions 28 or any other surface projecting from anatomical model structure 20 of FIG. 2a, coupler portions 14 may just as easily be protrusions that are adapted to interface with indentations on an anatomical model structure, magnetic devices having corresponding magnetic devices on anatomical model structure, lock and key mechanisms, male/female connectors, and the like (these embodiments not shown). Coupler portions 14 are preferably flexible, to allow anatomical model structure 20 to be inserted therein and removed therefrom, while still securing anatomical model structure 20 in place. In other words, coupler portions 14 are adapted to flex to receive and support at least a portion of the anatomical model structure 20.

Support 12 also has a substantially flat surface 16. Substantially flat surface 16 allows support 12 to securely cooperate with a table, mount, platform, or other stabilizing surface. It is also possible for substantially flat surface 16 to be curved slightly. Such curvature would likely necessitate cooperation with the mounting clamp, described below, in use for an actual surgical demonstration.

Anatomical model structure 20 is adapted to cooperate with support 12 so that anatomical model structure 20 maintains an orientation approximating the orientation of the anatomical structure as it would appear during surgery. Anatomical model structure 20 may be comprised of plastic, ceramic, cement, wood, styrofoam, metal, actual human bone, any combination thereof, or any other suitable material.

Anatomical model structure 20 may be a replica of any bodily structure, for example, a bony structure such as a knee, hip, finger, foot, shoulder, vertebral column and the like. Anatomical model structure 20 may alternatively be a nose, an eye, a digestive tract, intestine or part thereof, or any other structure that might ever need to be reproduced for demonstration purposes. Preferably, anatomical model structure 20 demonstrates features that correspond closely to the features of the human anatomy. More preferably, anatomical model structure 20 is a bony structure, and even more preferably, anatomical model structure 20 demonstrates features that correspond to the features of the human vertebral column, such as the natural curvature of the spine and the size, shape, and feel of vertebral bodies and connective tissue. For the remainder of this document, the discussion of the detailed specific embodiments will relate to anatomical model structure 20 as being a vertebral column, and preferably a cervical vertebral column, but this description is not intended to limit the invention in any way.

FIG. 2a illustrates an anatomical model structure 20 having cervical vertebrae 24 and connective tissue 26. Anatomical model structure 20 exhibits the natural curvature 22 of the spine. Again, it should be noted that anatomical model structure 20 may show thoracic or lumbar vertebrae, as well as other bone structures. In anatomical model structure 20 of FIG. 2a, each vertebrae 24 is shown having a series of protrusions 26. The protrusions 26 of the cervical vertebrae are the uncinate processes, but protrusions 26 of anatomical model structure 20 need not be an actual part of the bone, but may be instead extensions that extend from anatomical model structure 20 for connective purposes only.

Anatomical model structure 20 also preferably comprises tube 18 or other structure adapted to simulate a spinal cord.

If anatomical bone structure 20 is not a part of the vertebral column, it should optionally display the distinguishing features of the portion of the human anatomy that it represents. In the described embodiment, tube 18 may be comprised of plastic, PVC, hard rubber, metal, any combination thereof, or any other suitable material. Tube 18 is particularly useful for the surgical training aspects of certain embodiment of the invention, because it provides the trainee surgeon with the feel of the patient's spinal cord and indicates the precise instance that the surgical procedure has become too invasive, i.e., the point at which the instruments have gone too far and reached the spinal cord.

Collectively, support 12 and anatomical model structure 20 comprise demonstration model assembly 10, which may be used for the described demonstration purposes alone, that is, with protrusions 26 of anatomical model structure 20 corresponding with coupler portions 14 of support 12, and with flat surface 16 resting directly on a table or other surface. Alternatively, support 12 and anatomical model structure 20 may be secured for more stability by a demonstration platform and/or mounting clamp.

Figure 3:
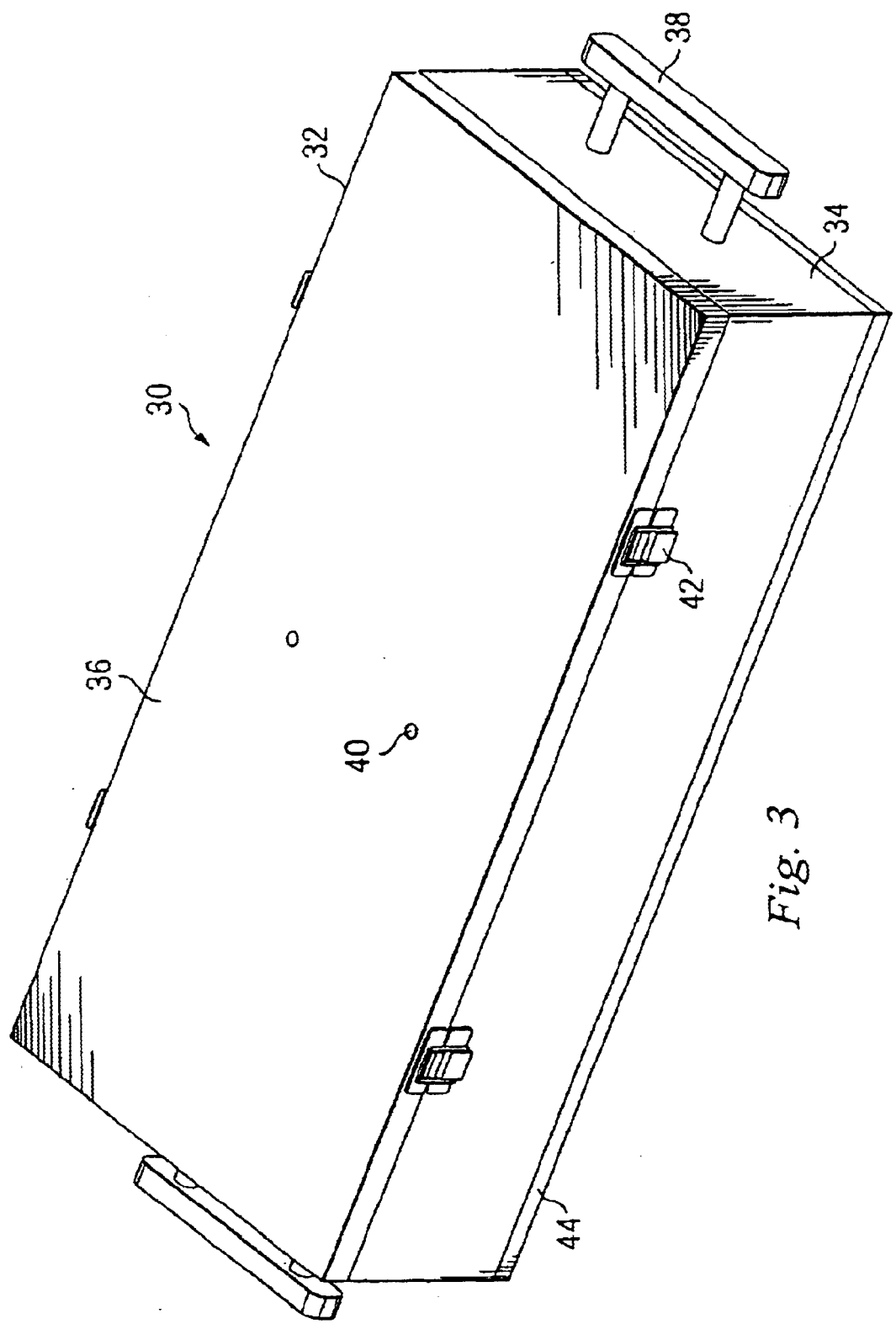
FIG. 3 is a perspective view of one embodiment of a demonstration platform of one embodiment of the invention.

One embodiment of a demonstration platform 30 is shown in FIG. 3. Demonstration platform 30 may be comprised of wood, plastic, steel, aluminum, any combination thereof, or any other suitable material. Demonstration platform 30 generally mimics some portion of the operating room that is necessary for properly completing the surgery being taught, displayed, or shown. For example, some surgical techniques require the use of operating room tables, with various equipment parts being secured thereto. In order for the surgeon to learn the proper positioning of equipment in relation to the table or other structure and the proper techniques associated with that positioning, there is a need for a portable display device that provides the look and feel of an operating room table, without actually requiring a full-length operating room table at the demonstration site.

Thus, one embodiment of demonstration platform 30 comprises side rails 38 that are traditionally located on most, if not all, operating room tables. In use, side rails 38 provide a number of functions during surgery, for example, a fixed location with respect to the patient for attachment of equipment and/or instruments. An exemplary medical procedure that uses side rails 38 for positioning and attachment of equipment is provided in co-pending U.S. application Ser. No. 09/783,860, entitled "Method and Apparatus for Stereotactic Implantation," filed Feb. 13, 2001, hereby incorporated herein by this reference.

In one embodiment of demonstration platform 30, at least one side rail 38 is provided that comprises a reduced-length operating room side rail 38, as shown in FIG. 3. Side rail 38 allows the surgeon to view and practice the use of equipment positioned in relation to the operating room side rail, without the need for providing an actual full-length side rail of an operating room table, which would extend the length of a patient's body.

It is preferred that demonstration platform 30 have two side rails 38, one on each side 34 of demonstration platform 30, in order to fully demonstrate the procedure in its entirety when necessary. Furthermore, providing at least two side rails 38 allows easy handling and transport of demonstration platform 30, because side rails 38 can also act as handles for lifting and carrying demonstration platform 30. Side rails 38 may be attached to sides 34 is any reasonable manner, such as being nailed, screwed, glued, welded, and the like.

Further features of demonstration platform 30 include sides 34 and top surface 36. Demonstration platform 30 should be at least a three-sided device, with the sides 34 connected by top surface 36, the sides 34 having side rails 38 attached thereto. Top surface 36 of demonstration platform 30 may define a connecting structure 40, which is adapted to interface with mounting clamp 50 of FIG. 4, described below.

Figure 4:
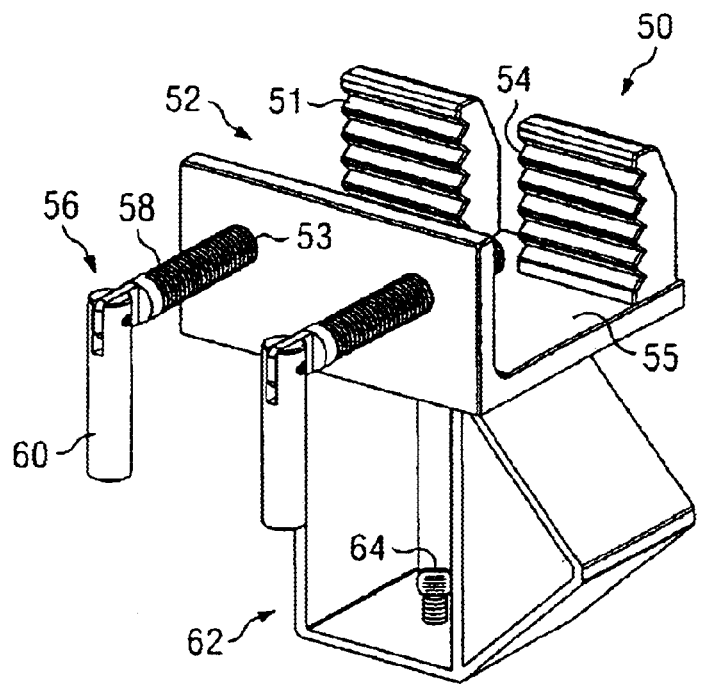
FIG. 4 is a side perspective view of one embodiment of a mounting clamp.

Connecting structure 40 may be an aperture (as shown), with corresponding mounting clamp 50 of FIG. 4 having a corresponding connecting device 64. Alternatively, connecting structure 40 may be a protrusion, with mounting clamp 50 having an indentation or aperture, or any other appropriate connecting structure known in the art (not shown).

In another embodiment of demonstration platform 30, demonstration platform 30 defines a four sided box, having sides 34, front panel 48, back panel (not shown), top cover 32, and bottom cover 44. Top cover 32 may actually be top surface 36, the difference being that top cover 32 is adapted for closure. Top cover 32 may comprise a lid, hinged or otherwise, connected to front panel 48 of demonstration platform 30, to provide a closable container. Optional closure structure 42 is also shown attached to demonstration platform 30 and top cover 32, and may comprise a latch, a magnetic structure, hook and latch material, snaps, buckles, male and female connectors, or any other closure or attachment structure adapted to maintain closure of top cover 32. Bottom cover 44 completes and encloses lower portion 46 of demonstration platform 30.

In the described four-sided box embodiment, demonstration platform 30 may house and transport surgical instruments, demonstration model assembly 10, mounting clamp 50, promotional materials, and/or any other items used for the demonstration.

Optionally, top cover 32 may open into a display board or promotional device, with material printed on the inside of top cover 32 or attached thereto, so that when the demonstration is not in session, demonstration platform 30 may act as a promotional tool itself. It may also have pockets for promotional brochures, business cards and the like.

Additionally, demonstration platform 30 may also have legs that allow it to be self-supporting. This is particularly useful is areas where space is limited and if tables and display areas are unattainable or in high demand. In this embodiment, it is beneficial for demonstration platform 30 to have side flaps that extend therefrom and lie substantially parallel with the floor to provide a surface for instruments and other equipment to rest when the demonstration platform 30 is in use.

This embodiment also provides a mounting clamp 50, shown in FIG. 4. Mounting clamp 50 facilitates cooperation between demonstration model assembly 10 and demonstration platform 30. Mounting clamp 50 comprises (i) cradle 52, for holding and stabilizing demonstration model assembly 10, and (ii) attachment structure 62, for securing mounting clamp 50 to the demonstration platform 30.

Cradle 52 preferably defines one or more shoulders 54 adapted to at least partially secure demonstration model assembly 10. Shoulders 54 may optionally have ridges or grooves 51 to help grip demonstration model assembly 10, shown in more detail in FIG. 5. Cradle 52 also has receiving surface 55 that is adapted to stabilize and support demonstration model assembly 10. More specifically, flat surface 16 of support 12 interfaces with receiving surface 55.

Cradle 52 provides a stabilizing function. For example, shoulders 54 of cradle may be movable so that they can open and securely clasp demonstration model assembly 10 in place. Alternatively, cradle 52, may have and additional stabilizing structure 56 which is adjustable to secure demonstration model assembly 10 in place.

Figure 5:
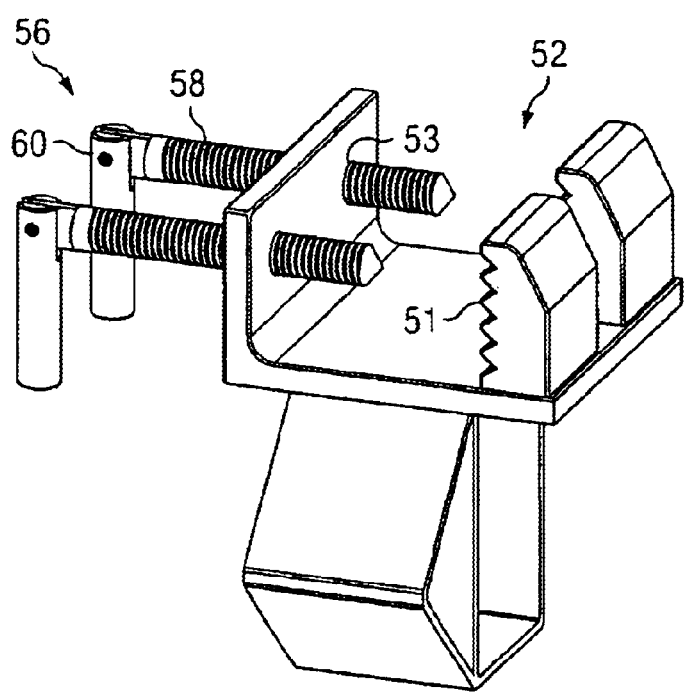
FIG. 5 is a front perspective view of the mounting clamp of FIG. 4.

In this embodiment, stabilizing structure 56 is any structure that can open and close on an item securely. One embodiment of stabilizing structure 56 preferably comprises threaded portion 58 and control portion 60. Threaded portion 58 interfaces with cradle 52 by intersecting with aperture 53 of cradle 52 or by mounting to cradle 52 (not shown). FIG. 5 illustrates in more detail the embodiment with threaded portion 58 intersecting cradle 52 through one or more apertures 53. Threaded portion 56 also has control portion 60 located at an end of threaded portion 56 or somewhere along the length of threaded portion 56. Control portion 60 allows the user to maneuver the placement of threaded portion 56 to optimize its securing function.

Mounting clamp 50 also has attachment structure 62, which supports cradle 52 and which attaches mounting clamp 50 to a stable surface. In one embodiment, attachment structure 62 is adapted to secure mounting clamp 50 to demonstration platform 30. In other embodiments, attachment structure 62 may attach mounting clamp directly to a table or other surface. Preferably, attachment structure 62 comprises connecting device 64 and interfacing surface 66.

Connecting device 64 may be a thumbscrew, magnet, peg, aperture, indentation, groove, or any other connecting mechanism that corresponds to either connecting structure 40 of demonstration platform 30 or to the surface to which mounting clamp 50 will be mounted. Interfacing surface 66 is preferably a substantially flat surface that is adapted to stably rest on a surface, such as top surface 36 of platform 32.

Figure 6:
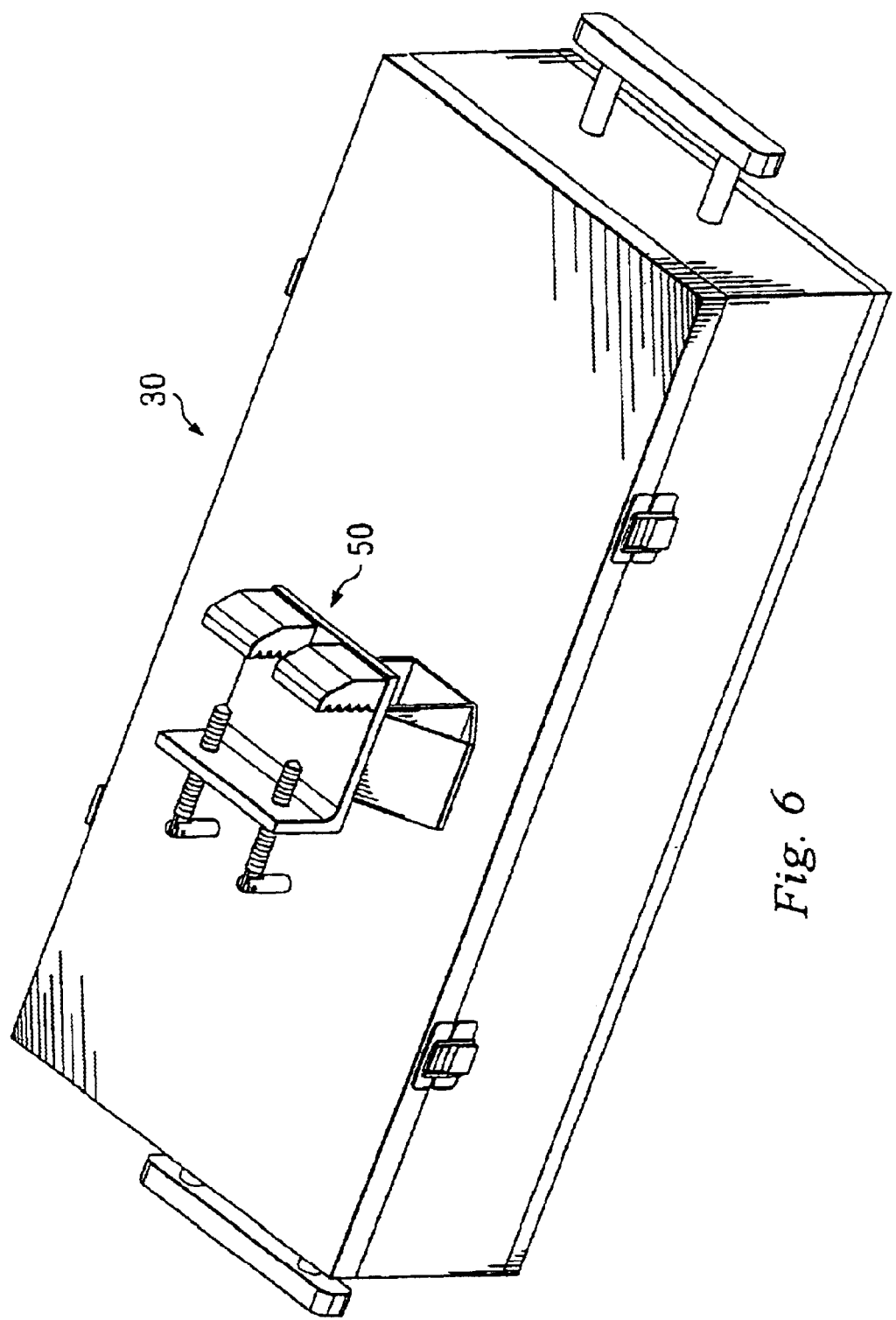
FIG. 6 is a perspective view of the mounting clamp of FIG. 4 mounted on the demonstration platform of FIG. 3.
Figure 7:
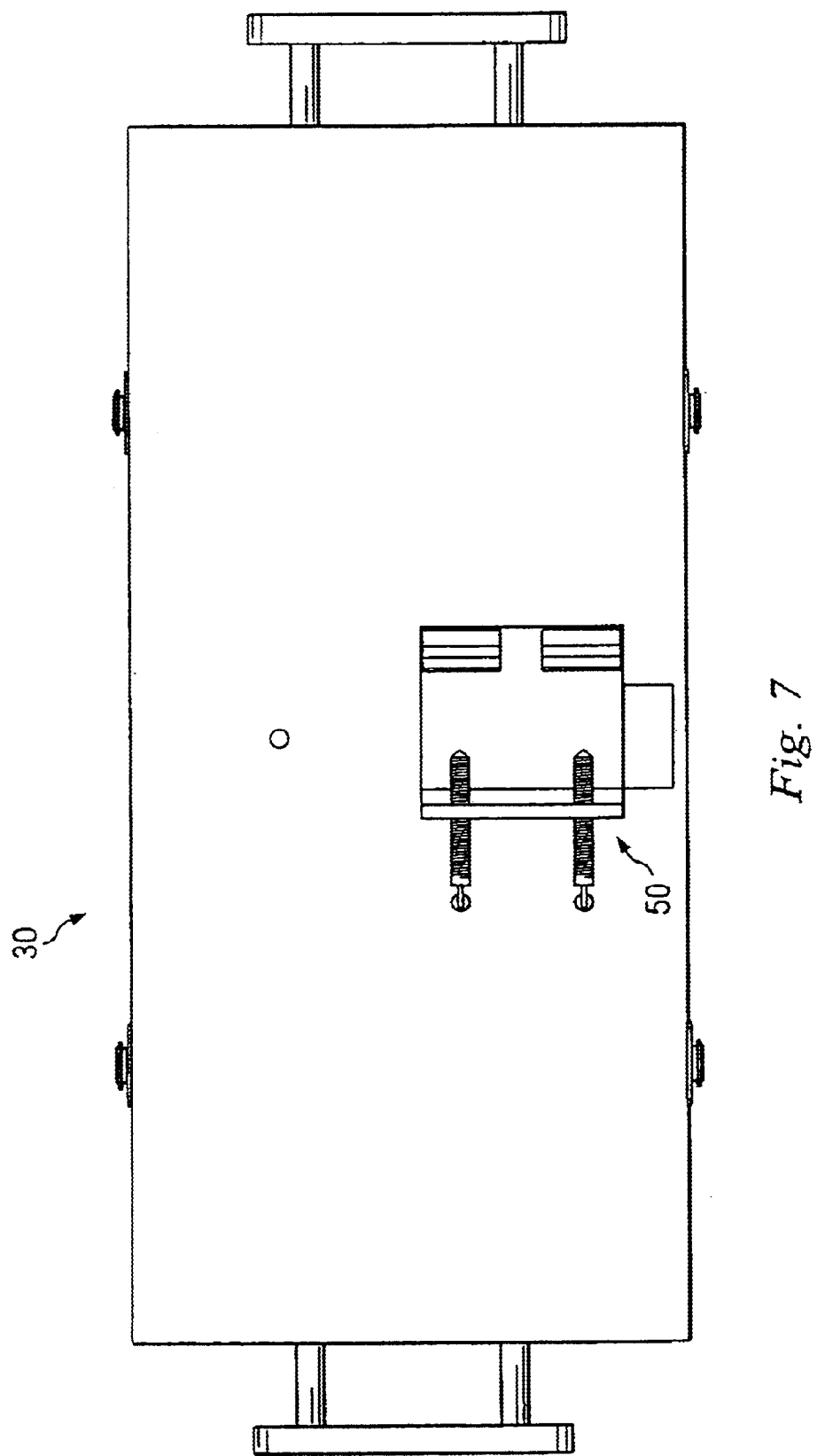
FIG. 7 is a top perspective view of the mounting clamp/demonstration platform of FIG. 6.

FIG. 6 illustrates mounting clamp 50 in relation to demonstration platform 30. Although not shown, in this embodiment, attachment structure 62 of mounting clamp 50 cooperates with connecting structure 40 of demonstration platform 30. FIG. 7 is a top perspective view of the demonstration platform 30 and mounting clamp 50 assembled together, as shown in FIG. 6.

Figure 8:
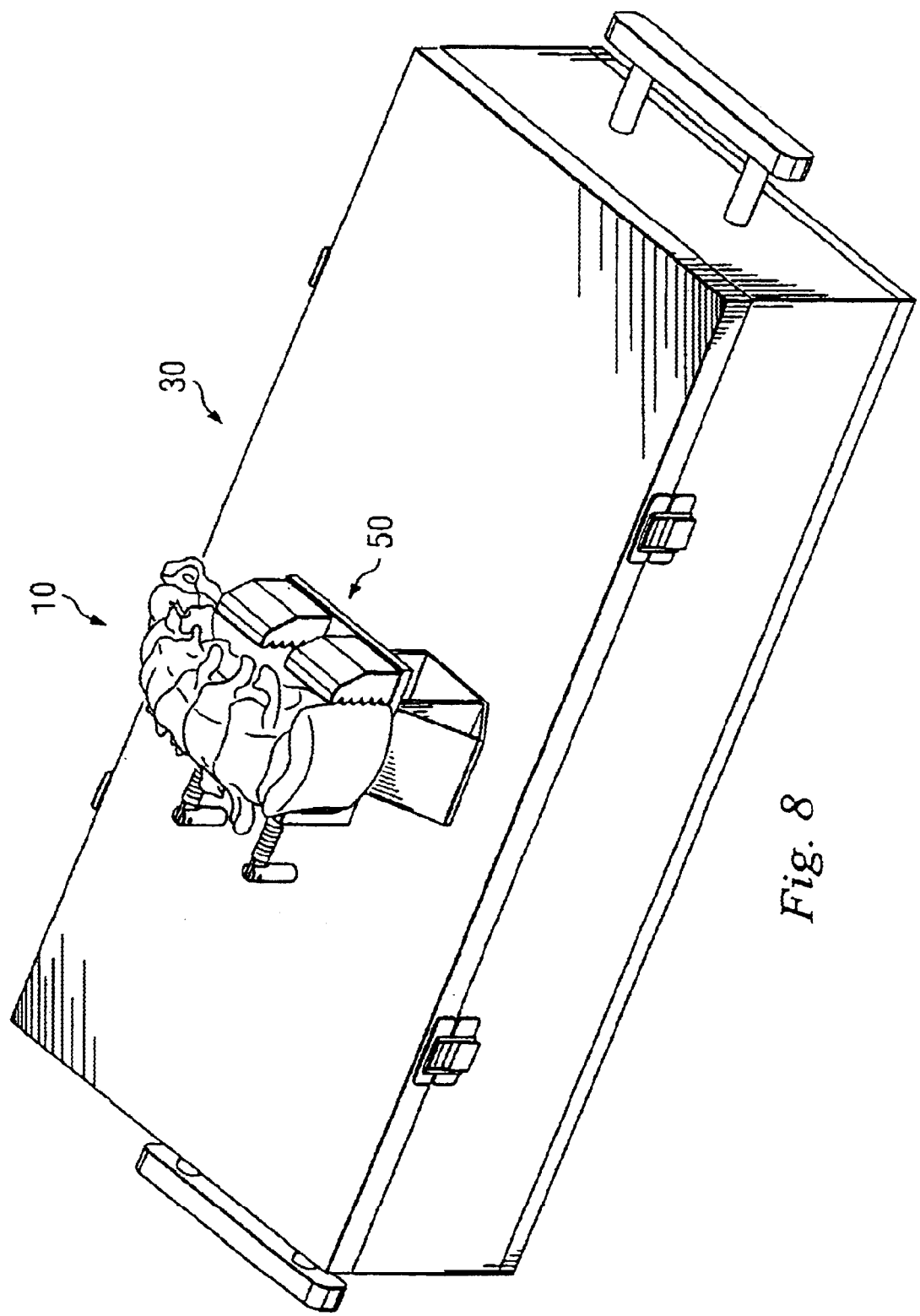
FIG. 8 is a top perspective view of the demonstration platform of FIG. 3 having the mounting clamp of FIG. 4 supporting the demonstration model assembly of FIG. 1.

Finally, FIGS. 8 and 9 illustrate demonstration model assembly 10 supported by mounting clamp 50, as well as demonstration platform 30.

Although suitable materials have been described for the elements of the various embodiments discussed above, it is anticipated that future research will produce alternatives to the materials described herein. The future existence of such materials which may be used in conjunction with the present embodiments shall not limit the breadth of the invention.

Additionally, it should be noted that demonstration devices according to the present embodiments for medical procedures may also be helpful to explain and demonstrate planned or recommended treatments to patients and their families. Such demonstration devices are intended to educate and reduce patient pre-treatment anxiety. Other equally beneficial uses of medical demonstration devices will readily suggest themselves to those involved, even peripherally, with the education of medical professionals, with the treatment of patients, and with the design, development, testing manufacture and sales—in fact, with virtually any aspect—of medical devices and the like.

The particular embodiments of the invention having been described above are not limiting of the present invention, and those of skill in the art can readily determine that additional embodiments and features of the invention are within the scope of the appended claims and equivalents thereto.

What is claimed is:

1. A demonstration platform, comprising:

two sides, at least one side having a reduced-length operating table side rail attached thereto; and a surface between the two sides, the surface having a connecting structure adapted to receive a demonstration model assembly.

2. The demonstration platform of claim 1, wherein the platform comprises a box and wherein the surface is a lid adapting the box to contain and transport surgical instruments.

3. The demonstration platform of claim 2, wherein the lid further comprises a closure structure to provide closure and locking functions.

4. The demonstration platform of claim 1, further comprising two side rails, one located on each side of the demonstration platform.

5. The demonstration platform of claim 1, wherein the connecting structure comprises an aperture in the top surface.

6. The demonstration platform of claim 1, wherein the connecting structure comprises:

a cradle having shoulders adapted to receive and secure the demonstration model assembly; and an attachment structure adapted to secure a mounting clamp to a stabilizing surface.

7. A demonstration model assembly comprising:

a carrying structure including a compartment for storing a plurality of surgical tools;

side rails mounted to opposing sides of the carrying structure; and a mounting system on a top surface of the carrying structure adapted to receive an anatomical model structure;

wherein the mounting system and the side rails are positioned to simulate an operating table.

8. The demonstration model assembly of claim 7 wherein the side rails are adapted to receive one or more tools used in orthopedic surgery.

9. The demonstration model assembly of claim 7 wherein the mounting system is one or more clamps.

10. The demonstration model assembly of claim 7 wherein the anatomical model structure represents at least a portion of a human spine.

\* \* \* \* \*